US011644382B2

(12) United States Patent
Gao et al.

(10) Patent No.: US 11,644,382 B2
(45) Date of Patent: May 9, 2023

(54) HIGH-TEMPERATURE BIAXIAL STRENGTH TESTER FOR CERAMIC MATRIX COMPOSITE (CMC) TURBINE VANE AND TEST METHOD THEREOF

(71) Applicant: Nanjing University of Aeronautics and Astronautics, Nanjing (CN)

(72) Inventors: Xiguang Gao, Nanjing (CN); Guoqiang Yu, Nanjing (CN); Yingdong Song, Nanjing (CN); Fangxiao Song, Nanjing (CN); Chuyang Xie, Nanjing (CN); Yunfa Jia, Nanjing (CN); Jinkang Du, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/875,447

(22) Filed: Jul. 28, 2022

(65) Prior Publication Data

US 2023/0032755 A1   Feb. 2, 2023

(30) Foreign Application Priority Data

Jul. 28, 2021   (CN) .......................... 202110858814.9

(51) Int. Cl.
*G01K 13/00* (2021.01)
*G01M 13/00* (2019.01)
*G01K 13/02* (2021.01)

(52) U.S. Cl.
CPC ............. *G01M 13/00* (2013.01); *G01K 13/00* (2013.01); *G01K 13/02* (2013.01)

(58) Field of Classification Search
CPC ....... G01M 13/00; G01K 13/00; G01K 13/02; G01K 7/028; G01K 7/02; G01K 7/08; G01K 7/16; G01K 7/226

(Continued)

(56) References Cited

U.S. PATENT DOCUMENTS

| 5,630,314 A * | 5/1997 | Kojima | ............... C23C 28/3455 |
| | | | 416/241 B |
| 8,961,007 B2 * | 2/2015 | Subramanian | .......... C23C 28/30 |
| | | | 374/1 |

(Continued)

FOREIGN PATENT DOCUMENTS

| CN | 101907547 A | 12/2010 |
| CN | 107421984 A | 12/2017 |

(Continued)

OTHER PUBLICATIONS

Fumiaki Watanabe, et al., Design and Testing For Ceramic Matrix Composite Turbine Vane, Proceedings of ASME Turbo Expo 2017: Turbomachinery Technical Conference and Exposition GT2017, 2017, pp. 1-8.

*Primary Examiner* — Gail Kaplan Verbitsky
(74) *Attorney, Agent, or Firm* — Bayramoglu Law Offices LLC

(57) ABSTRACT

A high-temperature biaxial strength tester for a CMC turbine vane includes a test stand, a thermal insulation box, a vane fixture, a biaxial loading device, thermocouples, a multi-channel thermometer, quartz lamps, a digital image correlation (DIC) system, and a cooling circulation system. The biaxial loading device includes two loading mechanisms arranged at 90° to each other. Each of the two loading mechanisms includes an electric cylinder and a ceramic push rod. One end of the ceramic push rod is connected to the electric cylinder, and the other end of the ceramic push rod extends into the thermal insulation box to contact an outer platform of the CMC turbine vane. The electric cylinder is provided with a load-displacement sensor. The thermocouples are arranged on the thermal insulation box. The (Continued)

quartz lamps are arranged inside the thermal insulation box. The multi-channel thermometer is connected to the thermocouples.

9 Claims, 5 Drawing Sheets

(58) Field of Classification Search
 USPC .............................. 374/4, 5, 45, 57, 141, 153
 See application file for complete search history.

(56) References Cited

U.S. PATENT DOCUMENTS

| | | | | |
|---|---|---|---|---|
| 2008/0101683 A1* | 5/2008 | Zombo | ................. | G01J 5/0022 382/141 |
| 2017/0328812 A1 | 11/2017 | Zhang et al. | | |
| 2018/0087973 A1* | 3/2018 | Shi | ........................ | C04B 41/009 |

FOREIGN PATENT DOCUMENTS

| | | | | | |
|---|---|---|---|---|---|
| CN | 107703003 | A | | 2/2018 | |
| CN | 108168856 | A | | 6/2018 | |
| CN | 108195706 | A | * | 6/2018 | ............... G01N 3/60 |
| CN | 108195706 | A | | 6/2018 | |
| CN | 109186908 | A | | 1/2019 | |
| CN | 109187219 | A | | 1/2019 | |
| CN | 110186583 | A | * | 8/2019 | |
| CN | 110631933 | A | | 12/2019 | |
| CN | 111693379 | A | | 9/2020 | |
| CN | 112710551 | A | | 4/2021 | |
| CN | 111579410 | B | * | 5/2021 | ............... G01N 3/04 |
| CN | 114353994 | A | * | 4/2022 | |
| CN | 113640140 | B | * | 6/2022 | |
| CN | 115165337 | A | * | 10/2022 | |
| CN | 115420481 | A | * | 12/2022 | |
| CN | 115493708 | A | * | 12/2022 | |
| SU | 905737 | B | * | 2/1982 | |
| WO | WO-2020248854 | A1 | * | 12/2020 | |

* cited by examiner

HIGH-TEMPERATURE BIAXIAL STRENGTH TESTER FOR CERAMIC MATRIX COMPOSITE (CMC) TURBINE VANE AND TEST METHOD THEREOF

CROSS REFERENCE TO THE RELATED APPLICATIONS

This application is based upon and claims priority to Chinese Patent Application No. 202110858814.9, filed on Jul. 28, 2021, the entire contents of which are incorporated herein by reference.

TECHNICAL FIELD

The present disclosure belongs to the field of structural and mechanical testing, and mainly relates to a high-temperature biaxial strength tester for a ceramic matrix composite (CMC) turbine vane and a test method thereof.

BACKGROUND

In order to improve efficiency, the turbine inlet temperature of aero-engines is constantly increasing. At present, the turbine inlet temperature of advanced aero-engines is as high as 1,700-2,000° C., and it is hard for superalloys to work stably at this temperature. Therefore, ceramic matrix composites (CMCs) with low density, high temperature resistance, and oxidation resistance have become the preferred materials for hot-end components of advanced aero-engines.

The CMC turbine vane is surrounded by high-temperature and high-pressure gas during operation and bears a large aerodynamic load and thermal stress. In addition, unlike superalloy vanes, the internal braided structure and connection form of CMC turbine vanes are complex, and the maximum bearing capacity and failure mode of CMC turbine vanes cannot be accurately acquired only by numerical simulation. At present, high-temperature static strength test is the fastest and most effective measure to verify the failure mode and bearing capacity of CMC turbine vanes. The pressure field around the turbine vane in the working state can be simplified as forces in both circumferential and axial directions of the engine. In order to more accurately acquire the bearing capacity and failure mode of CMC turbine vanes in service state, it is necessary to develop a test technique to apply loads in the circumferential and axial directions of the engine to the CMC turbine vane in a high-temperature environment. There are few reports on the turbine vane tester in the existing technical literature published in China and other countries. Chinese patent CN112710551A discloses a static strength tester for a composite vane, but this tester is only suitable for normal-temperature test and cannot apply temperature loads. Japan's IHI Corporation has carried out a normal-temperature static strength test on a CMC turbine vane (Fumiaki Watanabe, Takeshi Nakamura, Yousuke Mizokami. *Design and Testing for Ceramic Matrix Composite Turbine Vane* [C]. Turbomachinery Technical Conference and Exposition. Charlotte, N.C., USA. 2017, 6:1-8.). However, its test device cannot adjust the proportions of circumferential and axial loads and can only test specific vanes.

Based on the technical status in China and other countries and the application requirements of CMC turbine vanes, it is necessary to design a static strength tester that can simultaneously load the CMC turbine vane in the axial and circumferential directions at extremely high temperatures, such that the high-temperature static strength of the CMC turbine vane can be measured and analyzed to complete the verification of the bearing capacity and failure mode of the CMC turbine vane.

SUMMARY

In view of the deficiencies in the prior art, the present disclosure provides a high-temperature biaxial strength tester for a ceramic matrix composite (CMC) turbine vane and a test method thereof. The present disclosure can perform biaxial loading on the CMC turbine vane at a high temperature of 1,300° C. and multi-point temperature and strain field measurement on the CMC turbine vane during the loading process.

To achieve the above objective, the present disclosure adopts the following technical solution:

The high-temperature biaxial strength tester for a CMC turbine vane includes a test stand, a thermal insulation box, a vane fixture, a biaxial loading device, thermocouples, a multi-channel thermometer, quartz lamps, a digital image correlation (DIC) system, and a cooling circulation system. The thermal insulation box may be provided on the test stand. The vane fixture is configured to hold a lower end of the CMC turbine vane and may be provided in the thermal insulation box. The biaxial loading device includes two loading mechanisms arranged at 90° to each other. Each of the two loading mechanisms includes an electric cylinder and a ceramic push rod. One end of the ceramic push rod is connected to the electric cylinder, and the other end of the ceramic push rod extends into the thermal insulation box to contact an upper end of the CMC turbine vane. Two ceramic push rods are driven by the electric cylinders to preload the CMC turbine vane. The electric cylinder is provided with a load-displacement sensor for acquiring load-displacement data of the CMC turbine vane. The thermocouples are arranged on the thermal insulation box and are configured to acquire the temperature data of the CMC turbine vane. The quartz lamps are arranged inside the thermal insulation box and are configured to heat the CMC turbine vane. The multi-channel thermometer is connected to the thermocouples and is configured to process the surface temperature data acquired by the thermocouples. The DIC system is configured observe the CMC turbine vane and acquire strain field data of the CMC turbine vane. The cooling circulation system is configured to cool down the quartz lamps.

The present disclosure further adopts the following optimal solutions:

The CMC turbine vane may include an outer platform, a vane body, and an inner platform connected in sequence. The vane fixture may include a cover plate and a base. The inner platform may be inserted between the cover plate and the base and may be locked by the cover plate and the base in cooperation. The cover plate and the base may be fixed by high-temperature screws.

The electric cylinder may include a servo motor and a planetary reducer, and the servo motor may be connected to the planetary reducer. An output end of the planetary reducer may be connected to the ceramic push rod through a connecting rod.

The test stand may be provided with two slide rails. The biaxial loading device may be provided on the slide rails through electric cylinder brackets. The electric cylinders may be connected to the electric cylinder brackets. The electric cylinder brackets may be slidable along the slide rails or may be fixedly locked on the slide rails, such that the biaxial loading device may be close to or away from the thermal insulation box.

The load-displacement sensor on the electric cylinder may send an acquired signal to an electric cylinder control cabinet, and the electric cylinder control cabinet may drive the electric cylinder to load the CMC turbine vane. The quartz lamps may be connected to the multi-channel thermometer, and the multi-channel thermometer adjusts the power of the quartz lamps according to surface temperature data of the CMC turbine vane acquired by the thermocouples. A quartz glass window may be provided on a wall of the thermal insulation box. The DIC system may include a lens, which may be aimed at a pressure side of the CMC turbine vane through the quartz glass window, and may send an acquired image signal to a DIC image acquisition device.

Quartz lamp covers may be respectively arranged on two side walls of the thermal insulation box, and guide rails may be respectively arranged in the quartz lamp covers. Sliders may be slidable horizontally on the guide rails. The guide rails may be movable up and down or fixed by a lock nut. Two ends of the quartz lamp extend out of the thermal insulation box and into the quartz lamp covers, and two ends of the quartz lamp may be respectively arranged on the sliders.

The cooling circulation system may include a water circulation hose, a water tank, and a water pump. The connecting rod and the guide rails may be internally provided with water cooling channels. The water circulation hose connects the water cooling channels to form water circulation, where the water circulation has one end connected to the water pump and the other end placed in the water tank.

An end of the ceramic push rod in contact with the outer platform may have a shape fitting with the outer platform.

A wall of the thermal insulation box may be provided with threaded through holes. The thermocouples may respectively pass through hollow bolts and may be respectively fixed by screws that pass through sides of the hollow bolts. The hollow bolts may be respectively tightened in the threaded through holes. The thermocouples may respectively pass through the hollow bolts to enter the thermal insulation box and contact temperature measurement points on the CMC turbine vane.

A test method of the high-temperature biaxial strength tester for a CMC turbine vane includes the following steps:

step 1: evenly spraying high-temperature speckles on the pressure side of a CMC turbine vane to be tested;

step 2: holding the CMC turbine vane between the base and the cover plate of the vane fixture and fastening the base to the cover plate of the vane fixture through high-temperature screws;

step 3: fastening the base to the test stand and evenly spreading an aluminum silicate heat insulation layer on the base and an upper surface of the cover plate of the vane fixture;

step 4: mounting the quartz lamps in the quartz lamp covers and adjusting the quartz lamps to fit a contour of the vane body;

step 5: selecting four points on a section located in a middle part of the vane body and at a certain height in a radial direction of an engine as temperature assessment points; selecting two points at roots of two ends of the vane body as temperature measurement points; selecting three points on each of the outer platform and the inner platform as temperature measurement points; fastening the thermocouples to the thermal insulation box; and adjusting a measuring head of each of the thermocouples to contact the temperature measurement point;

step 6: adjusting the DIC system to clearly capture the speckles through the quartz glass window; adjusting exposure of the lens and focusing the lens; and checking the operation of the DIC system;

step 7: turning on the cooling circulation system, the multi-channel thermometer, and the electric cylinder control cabinet; checking the operation of each thermocouple through the multi-channel thermometer; and moving the ceramic push rod to a vicinity of the CMC turbine vane;

step 8: adjusting a temperature of the quartz lamps and heating the CMC turbine vane to a desired test temperature;

step 9: reducing the exposure of the lens and focusing the lens to ensure that the speckles are within a scope of the lens and are clearly visible;

step 10: zeroing the load-displacement sensors of the electric cylinders, adjusting the positions of the ceramic push rods, and preloading the CMC turbine vane when the ceramic push rods in two directions contact the CMC turbine vane;

step 11: subjecting the electric cylinders to displacement control and setting a loading speed of the electric cylinders according to the CMC turbine vane;

step 12: starting the DIC system and the electric cylinders simultaneously to ensure that data acquisition starts simultaneously;

step 13: resetting the electric cylinder after loading; saving strain data and load-displacement data; and turning off the DIC system, the quartz lamps, the thermal insulation box, and the electric cylinders;

step 14: turning off the water circulation system and the multi-channel thermometer when the multi-channel thermometer shows that the CMC turbine vane is cooled down to room temperature;

step 15: removing the vane fixture from the test stand; removing the high-temperature screws between the base and the cover plate of the vane fixture; and taking out the CMC turbine vane; and step 16: processing the data acquired by the electric cylinders and the DIC system and deriving a load-displacement curve of the CMC turbine vane.

The present disclosure may have the following advantages:

1. Quartz lamp heating has the advantages of small thermal inertia and high thermal efficiency. The present disclosure uses a combination of quartz lamps in a specific geometric arrangement as a heat source to ensure uniform heating radiation on the surface of the CMC turbine vane and a small overall temperature gradient. The quartz lamps cooperate with the thermal insulation box to achieve rapid heating and long-term stable insulation of the CMC turbine vane.

2. The present disclosure can perform bidirectional synchronous and asynchronous loading on the CMC turbine vane at high temperature to simulate the thermal load and aerodynamic load when the CMC turbine vane is working, such that the test load environment is close to the actual working state. In addition, the present disclosure can record the strain field of the vane body and the temperature field of the CMC turbine vane in real time, so as to acquire comprehensive and accurate test data.

3. The end surface of the ceramic push rod and the outer platform fit with each other and are in surface contact during loading. This design avoids damage to the loading position by the ceramic push rod and prevents the CMC turbine vane from twisting when loaded, thereby improving the accuracy of the test results. The cover plate of the vane fixture is provided with a notch, which has the same outer contour of the vane body section. In three-dimensional (3D) modeling software, the notch is formed by the outward offset of the vane body section. The notch has a smaller offset distance when it is close to the root of the vane body and has a larger offset distance when it is away from the root of the vane body. This design ensures the strength of the cover plate and provides space for the displacement of the vane body, preventing the contact between the vane body and the cover plate during the loading process from affecting the test data.

Figure 1:
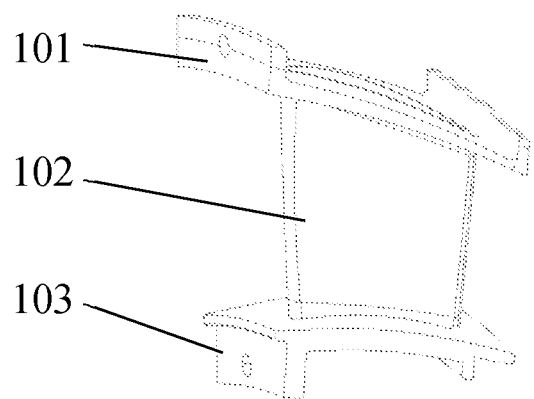
FIG. 1 is a schematic view of a ceramic matrix composite (CMC) turbine vane to be tested according to the present disclosure.

Reference Numerals: 101. outer platform; 102. vane body; 103. inner platform; 1. cover plate of vane fixture; 2. high-temperature screw; 3. base of vane fixture; 4. servo motor; 5. electric cylinder bracket; 6. quartz lamp cover; 7. slide rail; 8. test stand; 9. connecting rod; 10. thermal insulation box; 11. thermocouple; 12. planetary reducer; 13. aluminum silicate insulation layer; 14. ceramic push rod; 15. quartz glass window; 16. quartz lamp cover nut; 17. lock nut; 18. quartz lamp; 19. slider; 20. guide rail; 21. water cooling channel; 22. lens; 23. power supply and control cord of electric cylinder; 24. water circulation hose; 25. thermocouple connection cord; 26. multi-channel thermometer; 27. electric cylinder control cabinet; 28. water tank; and 29. water pump.

DETAILED DESCRIPTION OF THE EMBODIMENTS

The embodiments of the present disclosure are further described in detail below with reference to the drawings.

Figure 3:
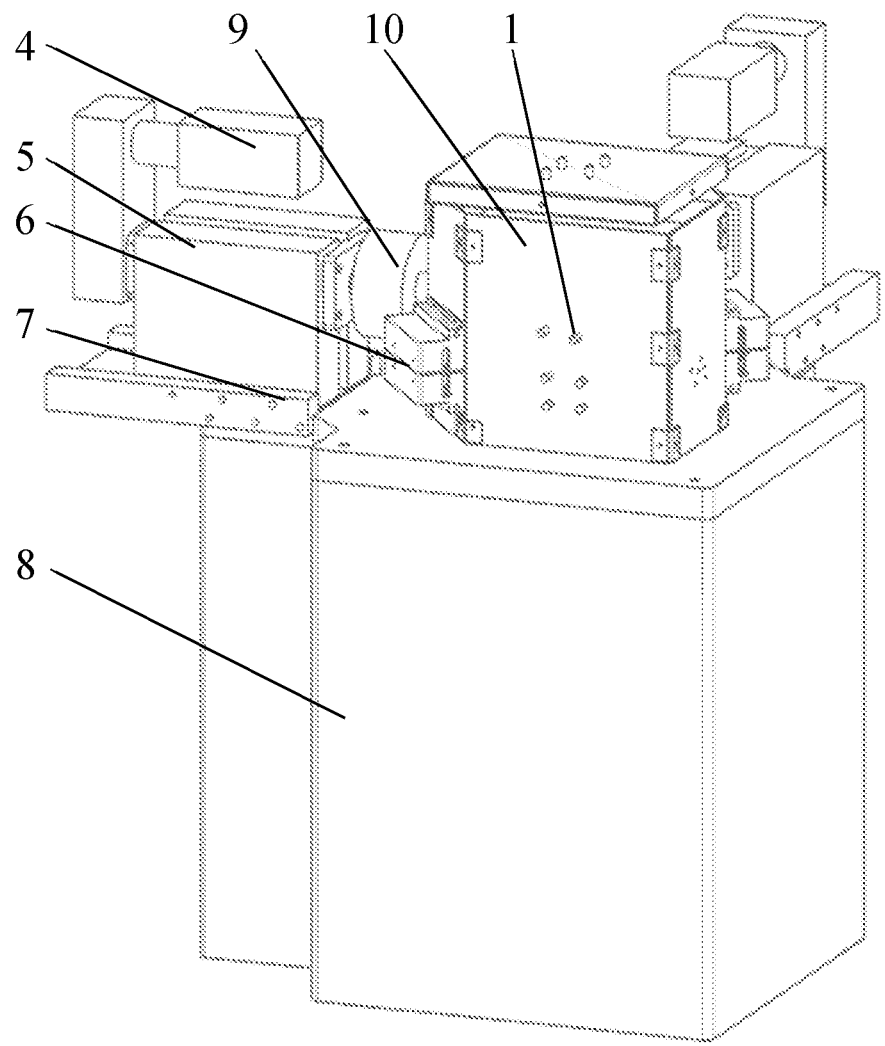
FIGS. 3 and 4 show a test stand according to the present disclosure.

As shown in FIG. 3, a thermal insulation box 10 is provided on a test stand 8. an inner platform 103 of a ceramic matrix composite (CMC) turbine vane is fixed between a base 3 and a cover plate 1 of a vane fixture. The vane fixture is placed inside the thermal insulation box and is fastened to the test stand through high-temperature screws 2. A ceramic push rod 13 has one end in contact with an outer platform 101 of the CMC turbine vane and the other end connected to an output end of a planetary reducer 12 of an electric cylinder through a connecting rod 9. The electric cylinder is connected to a slide rail 7 through an electric cylinder bracket 5. The slide rail 7 is provided on the test stand 8, and the electric cylinder is movable back and forth on the slide rail 7. A load-displacement sensor on the electric cylinder sends an acquired signal to an electric cylinder control cabinet 27, and the electric cylinder control cabinet 27 drives the electric cylinder to load the CMC turbine vane. Thermocouples 11 are fixed to the thermal insulation box 10 and are configured to acquire and send surface temperature data of the CMC turbine vane to a multi-channel thermometer 26. A quartz lamp 18 is connected to a multi-channel thermometer 26, and the multi-channel thermometer 26 adjusts the power of the quartz lamp 18 according to the surface temperature data of the CMC turbine vane acquired by the thermocouple 11. A lens 22 of a digital image correlation (DIC) strain field measurement system (hereinafter referred to as a DIC system) is aimed at a pressure side of the CMC turbine vane. A wall of the thermal insulation box is provided with a quartz glass window 15. The lens 22 sends an acquired image signal to a DIC image acquisition device. The connecting rod 9 and a quartz lamp cover 6 are internally provided with water cooling channels 21, and the water cooling channels 21 are connected by a water circulation hose 24. The water circulation hose has one end connected to a water pump and the other end provided in a water tank.

Figure 5:
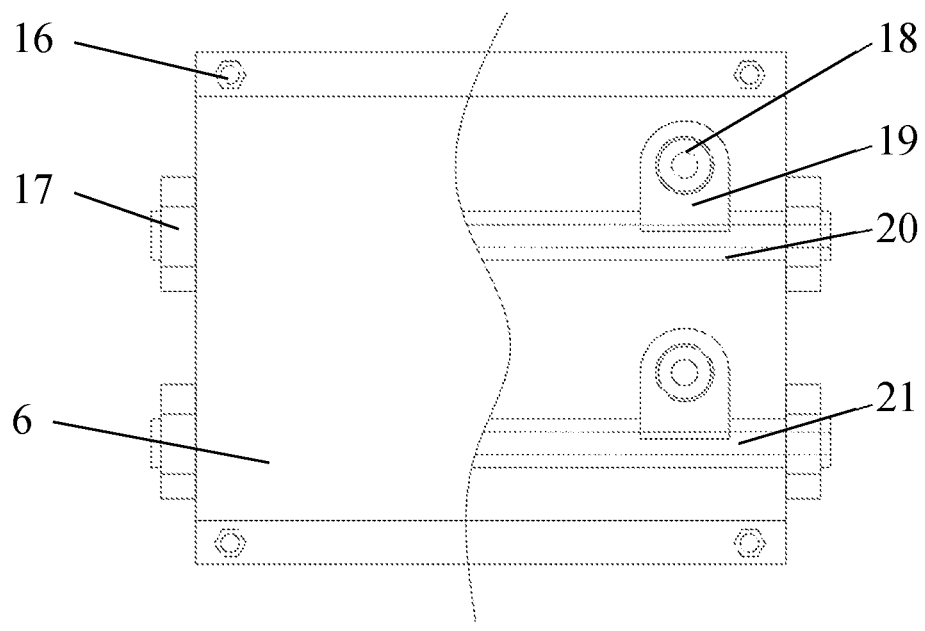
FIG. 5 is a schematic view of a quartz lamp adjustment mechanism according to the present disclosure.
Figure 6:
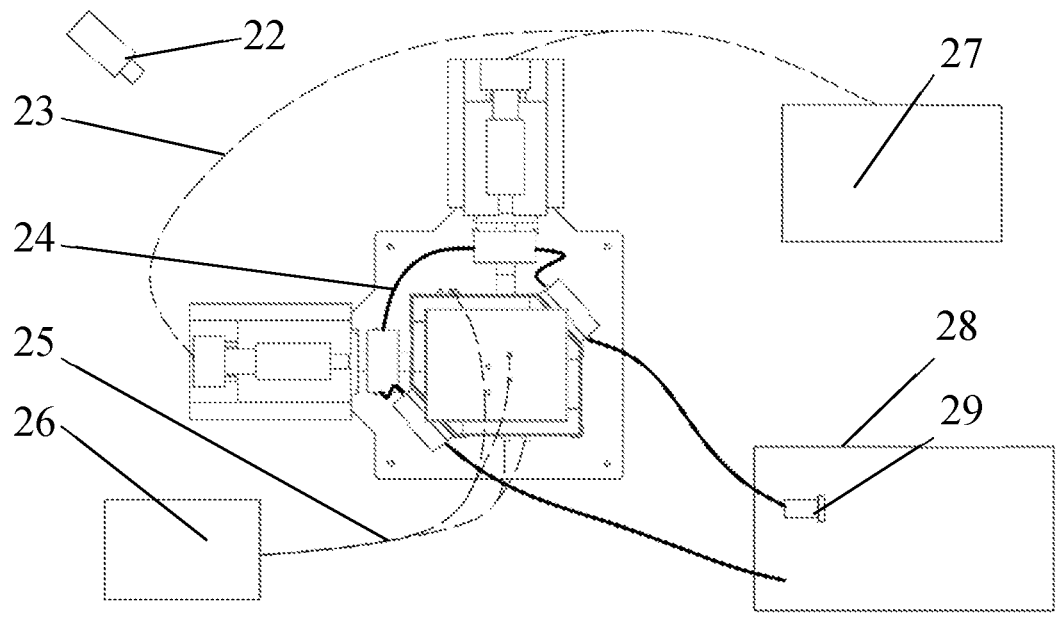
FIG. 6 is an overall schematic view of a high-temperature biaxial strength tester according to the present disclosure.

As shown in FIG. 5, a quartz lamp adjustment mechanism includes a copper slider 19 and a copper guide rail 20. Two ends of the quartz lamp protrude out of the thermal insulation box 10 and pass through the copper slider 19. The copper slider 19 is provided on the copper guide rail 20 and is slidable horizontally on the copper guide rail 20. The quartz lamp cover 6 is made of Hastelloy and covers the two ends of the quartz lamp. A side of the quartz lamp cover is provided with an oval slot. The copper guide rail is movable up and down or fixed by a lock nut 17. The copper slide rail is internally provided with the water cooling channel 21, two ends of which are connected to the water circulation hose 24.

Figure 4:
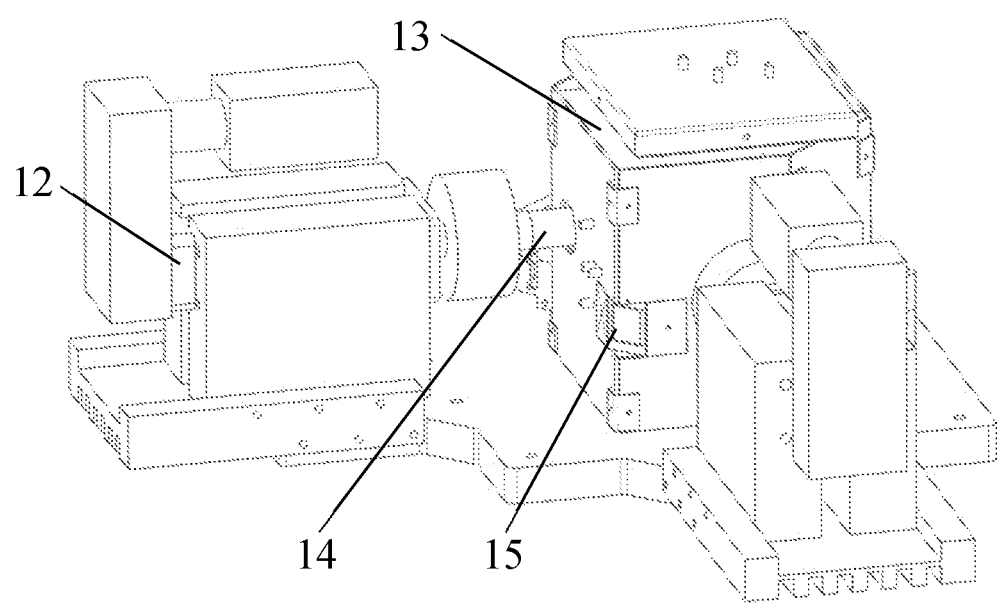

As shown in FIG. 4, the output end of the planetary reducer is connected to one end of a ceramic push rod 14 through the connecting rod 9. The connecting rod is provided therein with a through hole as a water circulation passage to connect the water circulation hose 24. The other end of the ceramic push rod 14 is in contact with the outer platform 101 of the CMC turbine vane, and a contact end surface of the ceramic push rod has a shape fitting with the outer platform 101 of the CMC turbine vane. There are two electric cylinders driving two ceramic push rods. The two ceramic push rods load in two vertical directions. That is, they act on the outer platform of the CMC turbine vane along an axial direction and a circumferential direction of the CMC turbine vane simultaneously.

Figure 2:
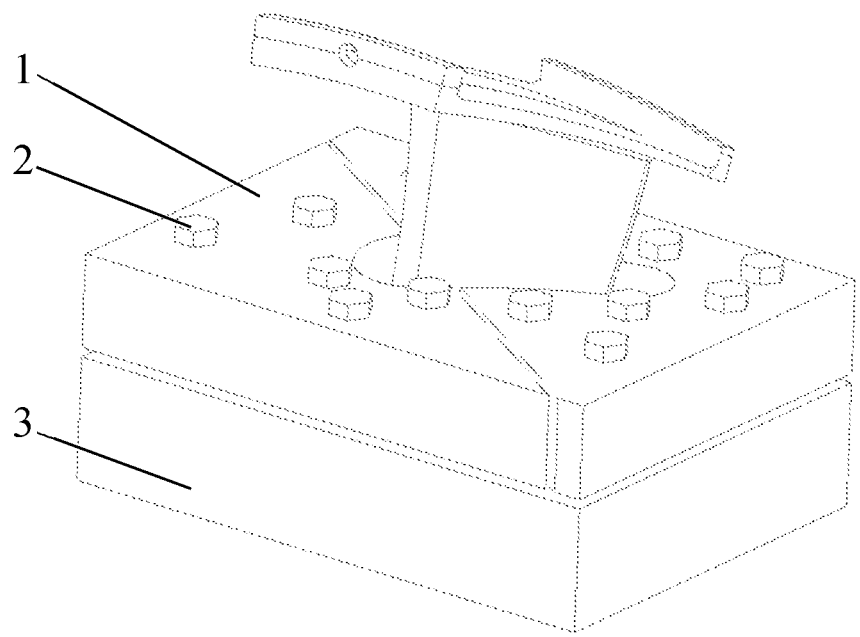
FIG. 2 is a schematic view of a fixture for holding the CMC turbine vane to be tested according to the present disclosure.

As shown in FIG. 2, the vane fixture for holding the inner platform is made of Hastelloy, and includes two parts: the base and the cover plate. The base is provided with a slot that is configured in a shape of a lower surface of the inner platform 103 of the CMC turbine vane. There are two cover plate portions, and lower surfaces of the cover plate portions are provided with slots that are configured in a shape of an upper surface of the inner platform 103 of the CMC turbine vane. A notch is provided at an adjoining part of the two cover plate portions for a vane body 102 of the CMC turbine vane to pass through. The notch is formed by offsetting an outer contour line of the vane body outward, and it is trumpet-shaped from bottom to top along a thickness direction of the cover plate portions. A space is provided between the cover plate portions and the base to ensure that the inner platform 103 of the CMC turbine vane is pressed tightly during mounting. The base and the cover plate portions are connected by multiple high-temperature alloy screws 2. A layer of aluminum silicate insulation layer is evenly spread on upper surfaces of the cover plate portions to reduce incoming heat radiation.

The high-temperature biaxial strength tester is used to test a CMC turbine vane.

The DIC system includes the lens, a tripod, a connection device, and an image acquisition device. A side of the thermal insulation box is provided with the quartz glass window, and the lens acquires strain field data on the pressure side of the CMC turbine vane through the quartz glass window.

A test method of the high-temperature biaxial strength tester for the CMC turbine vane includes the following steps:

Step 1: Evenly spray high-temperature speckles on the pressure side in a middle part of the vane body 102 of the CMC turbine vane.

Step 2: Hold the CMC turbine vane with the inner platform 103 of the CMC turbine vane located between the base 3 and the cover plate 1 and fixedly connect the cover plate 1 to the base 3 through the high-temperature alloy screws 2.

Step 3: Fasten the base in the thermal insulation box 10 on the test stand by bolts and evenly spread the aluminum silicate heat insulation layer on the upper surface of the vane fixture.

Step 4: Mount the quartz lamp 18, connect a quartz lamp power cord to the multi-channel thermometer 26, and adjust a position of the quartz lamp 18, such that the quartz lamp 18 is close to the CMC turbine vane and fits a contour of the vane body 102.

Step 5: Select four points on a section located in the middle part of the vane body 102 and at a certain height in a radial direction of an engine as temperature assessment points; select two points at roots of two ends of the vane body as temperature measurement points; select three points on each of the outer platform 101 and the inner platform 103 as temperature measurement points; fasten the thermocouples 11 to the wall of the thermal insulation box 10; and adjust a measuring head of each of the thermocouples to contact the temperature measurement point.

Step 6: Connect and turn on the DIC system, aim the lens 22 at a region sprayed with the high-temperature speckles through the quartz glass window, and adjust an exposure and a focus of the lens to ensure that the speckles are clearly visible.

Step 7: Turn on the water pump 29, the multi-channel thermometer 26, and the electric cylinder control cabinet 27; check whether each thermocouple 11 works normally through the multi-channel thermometer 26; and move the ceramic push rod 14 through the electric cylinder control cabinet to about 5 mm in a vicinity of the CMC turbine vane.

Step 8: Turn on the multi-channel thermometer 26 and heat the CMC turbine vane to a desired test temperature.

Step 9: Reduce the exposure of the lens 22 to ensure that the speckles are within a scope of the lens and are clearly visible and set a shooting frequency of the DIC system to 1 Hz.

Step 10: Zero the load-displacement sensor on the electric cylinder, adjust positions of the ceramic push rods 14, and preload the CMC turbine vane after the ceramic push rods in the two directions contact the CMC turbine vane.

Step 11: Subject the electric cylinders to displacement control and set a loading speed of the electric cylinders according to the CMC turbine vane, where the loading speed of the ceramic push rod in the axial direction is twice the loading speed in the circumferential direction.

Step 12: Start the DIC system and the electric cylinders simultaneously to ensure that data acquisition starts simultaneously.

Step 13: Reset the ceramic push rod 14 after loading; save data acquired by the DIC system and the load-displacement sensors of the electric cylinders; and turn off the DIC system, the quartz lamp, the electric cylinder, and the electric cylinder control cabinet 27.

Step 14: Turn off the water pump 29 and the multi-channel thermometer 26 when the multi-channel thermometer 26 shows that the CMC turbine vane is cooled down to room temperature.

Step 15: Remove the quartz lamp 18 and the thermocouple 11; remove the bolts between the vane fixture and the test stand, take the vane fixture out of the thermal insulation box, remove the high-temperature screws 2 connecting the base 3 and the cover plate 1, and take out the CMC turbine vane.

Figure 7:
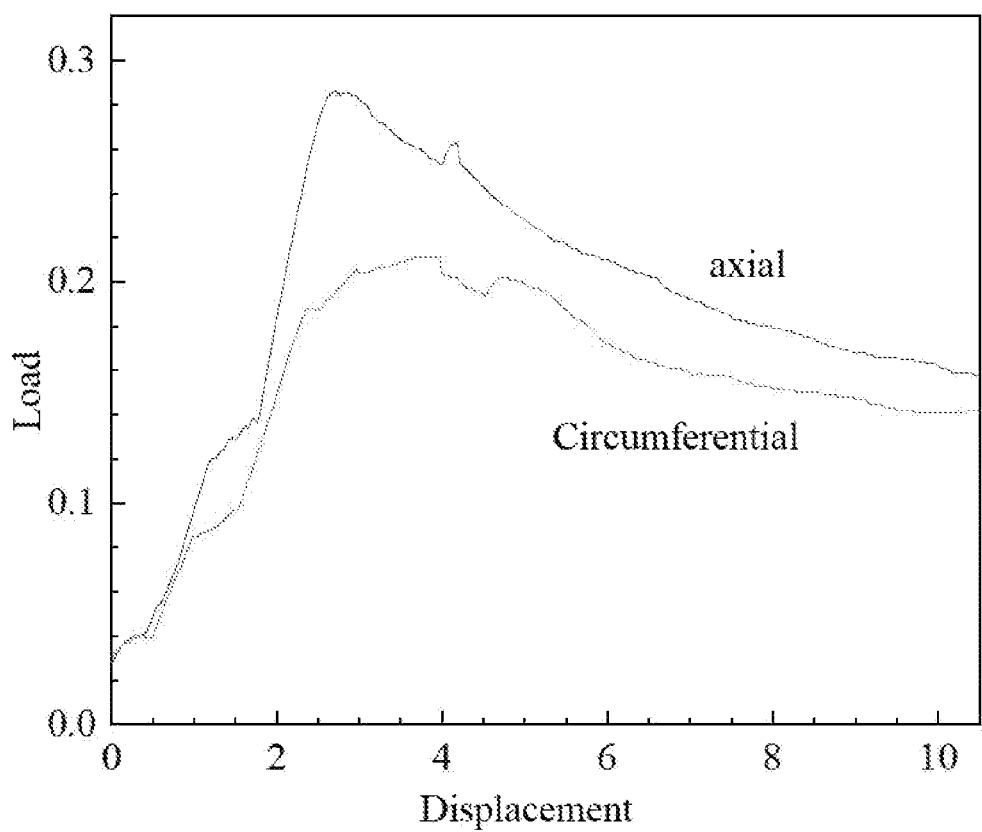
FIG. 7 shows a load-displacement curve derived from a test.

Step 16: Process the data acquired by the electric cylinders and the DIC system and derive a load-displacement curve (as shown in FIG. 7).

The above described are only preferred implementations of the present disclosure, and the scope of the present disclosure is not limited thereto. All technical solutions based on the idea of the present disclosure should fall within the protection scope of the present disclosure. It should be noted that several modifications and adaptations made by those of ordinary skill in the art without departing from the principle of the present disclosure should fall within the scope of protection of the present disclosure.

What is claimed is:

1. A high-temperature biaxial strength tester for a ceramic matrix composite (CMC) turbine vane comprising a test stand, a thermal insulation box, a vane fixture, a biaxial loading device, thermocouples, a multi-channel thermometer, quartz lamps, a digital image correlation (DIC) system for strain field measurement, and a cooling circulation system, wherein the thermal insulation box is provided on the test stand; the vane fixture is configured to hold a lower end of the CMC turbine vane and the vane fixture is provided in the thermal insulation box; the biaxial loading device comprises two loading mechanisms arranged at 90° to each other; each of the two loading mechanisms comprises an electric cylinder and a ceramic push rod; one end of the ceramic push rod is connected to the electric cylinder, and the other end of the ceramic push rod extends into the thermal insulation box to contact an upper end of the CMC turbine vane; two ceramic push rods are driven by the electric cylinders to load the CMC turbine vane; the electric cylinder is provided with a load-displacement sensor for acquiring load-displacement data of the CMC turbine vane; the thermocouples are arranged on the thermal insulation box and the thermocouples are configured to acquire surface temperature data of the CMC turbine vane; the quartz lamps are arranged inside the thermal insulation box and the quartz lamps are configured to heat the CMC turbine vane; the multi-channel thermometer is connected to the thermocouples and the multi-channel thermometer is configured to process the surface temperature data acquired by the thermocouples; the DIC system is configured to observe the CMC turbine vane and acquire strain field data of the CMC turbine vane; and the cooling circulation system is configured to cool down the quartz lamps; the CMC turbine vane comprises an outer platform, a vane body and an inner platform, wherein the outer platform, the vane body and the inner platform are connected in sequence; the vane fixture comprises a cover plate and a base; the inner platform is inserted between the cover plate and the base and the inner platform is locked by the cover plate and the base in cooperation; and the cover plate and the base are fixed by high-temperature screws.

2. The high-temperature biaxial strength tester for the CMC turbine vane according to claim 1, wherein the electric cylinder comprises a servo motor and a planetary reducer, wherein the servo motor is connected to the planetary reducer; and an output end of the planetary reducer is connected to the ceramic push rod through a connecting rod.

3. The high-temperature biaxial strength tester for the CMC turbine vane according to claim 2, wherein the test stand is provided with two slide rails; the biaxial loading device is provided on the slide rails through electric cylinder brackets, wherein the electric cylinder brackets are configured to be fixedly locked at different positions on the slide rails; and the electric cylinders are provided on the electric cylinder brackets.

4. The high-temperature biaxial strength tester for the CMC turbine vane according to claim 3, wherein the load-displacement sensor on the electric cylinder is configured to send an acquired signal to an electric cylinder control cabinet, and the electric cylinder control cabinet is configured to drive the electric cylinder to load the CMC turbine vane; the quartz lamps are connected to the multi-channel thermometer, and the multi-channel thermometer is configured to adjust power of the quartz lamps according to the surface temperature data of the CMC turbine vane acquired by the thermocouples; a quartz glass window is provided on a wall of the thermal insulation box; and the DIC system comprises a lens, wherein the lens is configured to aim at a pressure side of the CMC turbine vane through the quartz glass window and send an acquired image signal to a DIC image acquisition device.

5. The high-temperature biaxial strength tester for the CMC turbine vane according to claim 4, wherein quartz lamp covers are respectively arranged on two side walls of the thermal insulation box, and guide rails are respectively arranged in the quartz lamp covers; sliders are slidable horizontally on the guide rails; the guide rails are movable up and down or fixed by a lock nut; and two ends of the quartz lamp extend out of the thermal insulation box and into the quartz lamp covers, and the two ends of the quartz lamp are respectively arranged on the sliders.

6. The high-temperature biaxial strength tester for the CMC turbine vane according to claim 5, wherein the cooling circulation system comprises a water circulation hose, a water tank, and a water pump; the connecting rod and the guide rails are internally provided with water cooling channels; and the water circulation hose connects the water cooling channels to form water circulation, wherein the water circulation has one end connected to the water pump and the other end placed in the water tank.

7. The high-temperature biaxial strength tester for the CMC turbine vane according to claim 6, wherein an end of the ceramic push rod in contact with the outer platform has a shape fitting with the outer platform.

8. The high-temperature biaxial strength tester for the CMC turbine vane according to claim 7, wherein a wall of the thermal insulation box is provided with threaded through holes; the thermocouples respectively pass through hollow bolts and are respectively fixed by screws that pass through sides of the hollow bolts; the hollow bolts are respectively tightened in the threaded through holes; and the thermocouples respectively pass through the hollow bolts to enter the thermal insulation box and contact temperature measurement points on the CMC turbine vane.

9. A test method of the high-temperature biaxial strength tester for the CMC turbine vane according to claim 8, comprising the following steps:

step 1: evenly spraying high-temperature speckles on the pressure side of the CMC turbine vane to be tested;

step 2: holding the CMC turbine vane between the base and the cover plate of the vane fixture and fastening the base to the cover plate of the vane fixture through the high-temperature screws;

step 3: fastening the base to the test stand and evenly spreading an aluminum silicate heat insulation layer on the base and an upper surface of the cover plate of the vane fixture;

step 4: mounting the quartz lamps in the quartz lamp covers and adjusting the quartz lamps to fit a contour of the vane body;

step 5: selecting four points on a section located in a middle part of the vane body and at a certain height in a radial direction of an engine as temperature assessment points; selecting two points at roots of two ends of the vane body as temperature measurement points; selecting three points on each of the outer platform and the inner platform as temperature measurement points; fastening the thermocouples to the thermal insulation box; and adjusting a measuring head of each of the thermocouples to contact the temperature measurement point;

step 6: adjusting the DIC system to clearly capture the speckles through the quartz glass window; adjusting exposure of the lens, and focusing the lens; and checking operation of the DIC system;

step 7: turning on the cooling circulation system, the multi-channel thermometer, and the electric cylinder control cabinet; checking operation of each thermocouple through the multi-channel thermometer; and moving the ceramic push rod to a vicinity of the CMC turbine vane;

step 8: adjusting a temperature of the quartz lamps and heating the CMC turbine vane to a desired test temperature;

step 9: reducing the exposure of the lens, and focusing the lens to ensure that the speckles are within a scope of the lens and are clearly visible;

step 10: zeroing the load-displacement sensors of the electric cylinders, adjusting positions of the ceramic push rods, and preloading the CMC turbine vane when the ceramic push rods in two directions contact the CMC turbine vane;

step 11: subjecting the electric cylinders to displacement control and setting a loading speed of the electric cylinders according to the CMC turbine vane;

step 12: starting the DIC system and the electric cylinders simultaneously to ensure that data acquisition starts simultaneously;

step 13: resetting the electric cylinders after loading; saving strain data and load-displacement data; and turning off the DIC system, the quartz lamps, the thermal insulation box, and the electric cylinders;

step 14: turning off the water circulation system and the multi-channel thermometer when the multi-channel thermometer shows that the CMC turbine vane is cooled down to room temperature;

step 15: removing the vane fixture from the test stand; removing the high-temperature screws between the base and the cover plate of the vane fixture; and taking out the CMC turbine vane; and step 16: processing the data acquired by the electric cylinders and the DIC system and deriving a load-displacement curve of the CMC turbine vane.

* * * * *